E. B. Tanner.
Horse Hay Fork.
Nº 44470   Patented Sep. 27, 1864
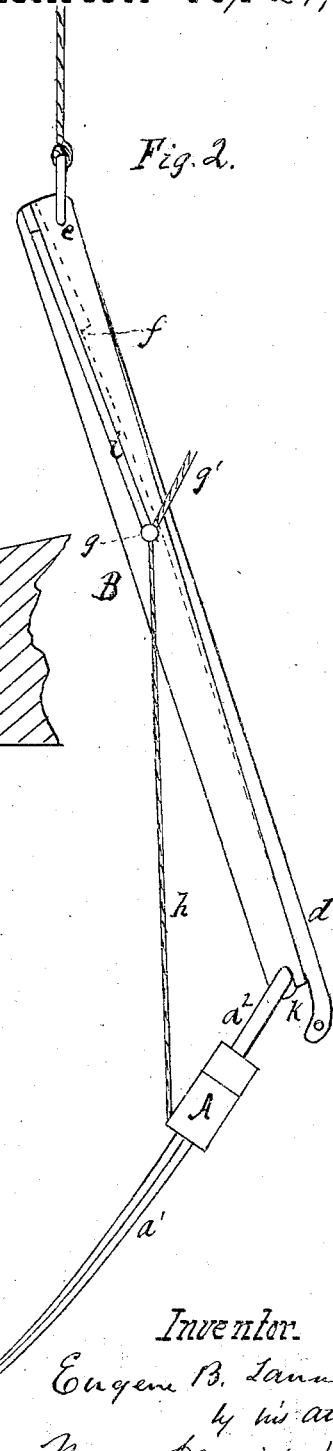
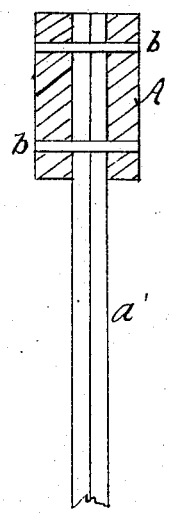
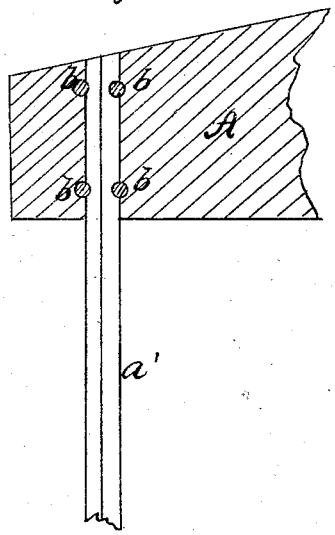
Witnesses.
R. T. Campbell
E. Schafer
Inventor.
Eugene B. Tanner
by his atty's
Mason Fenwick & Lawrence

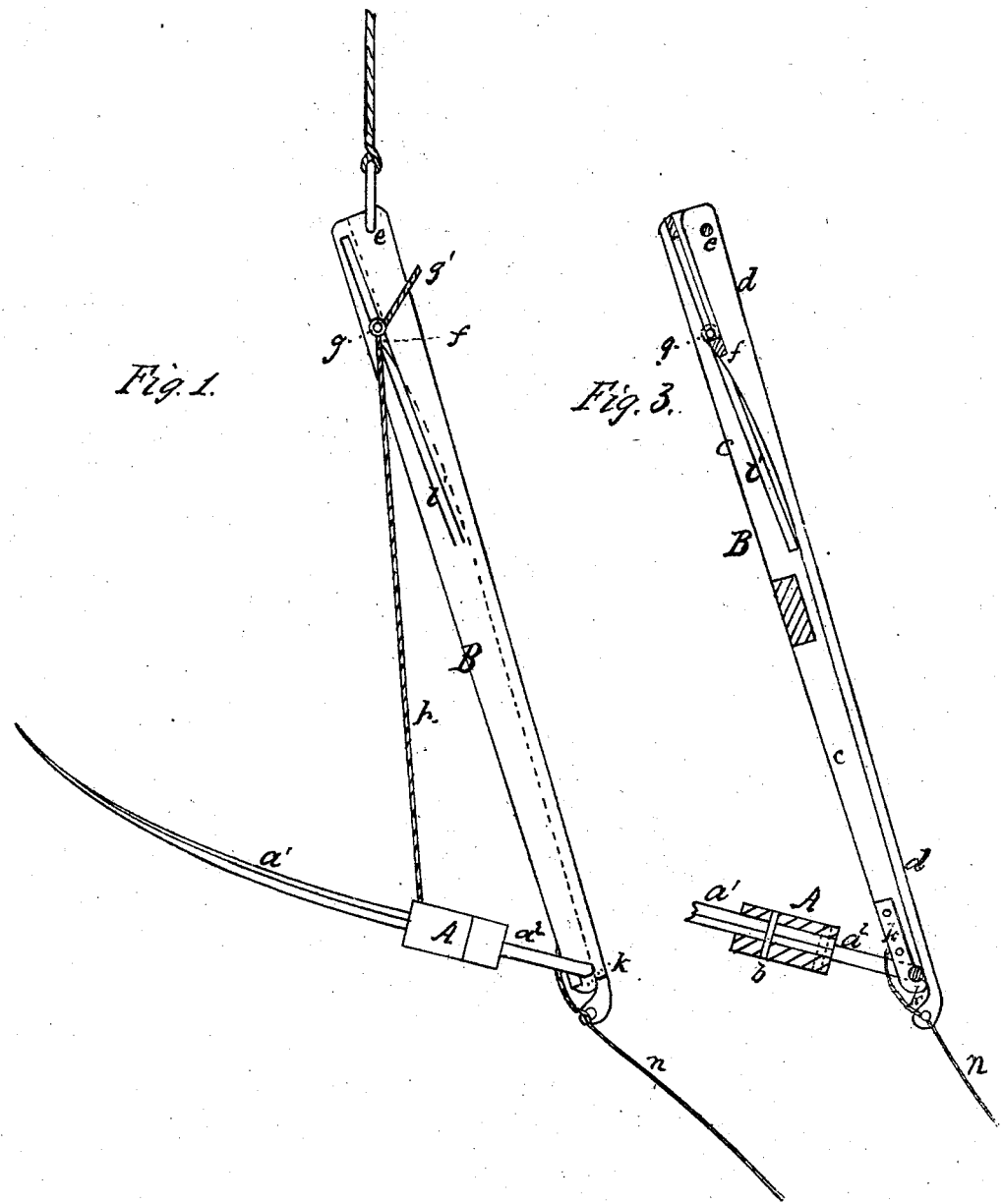

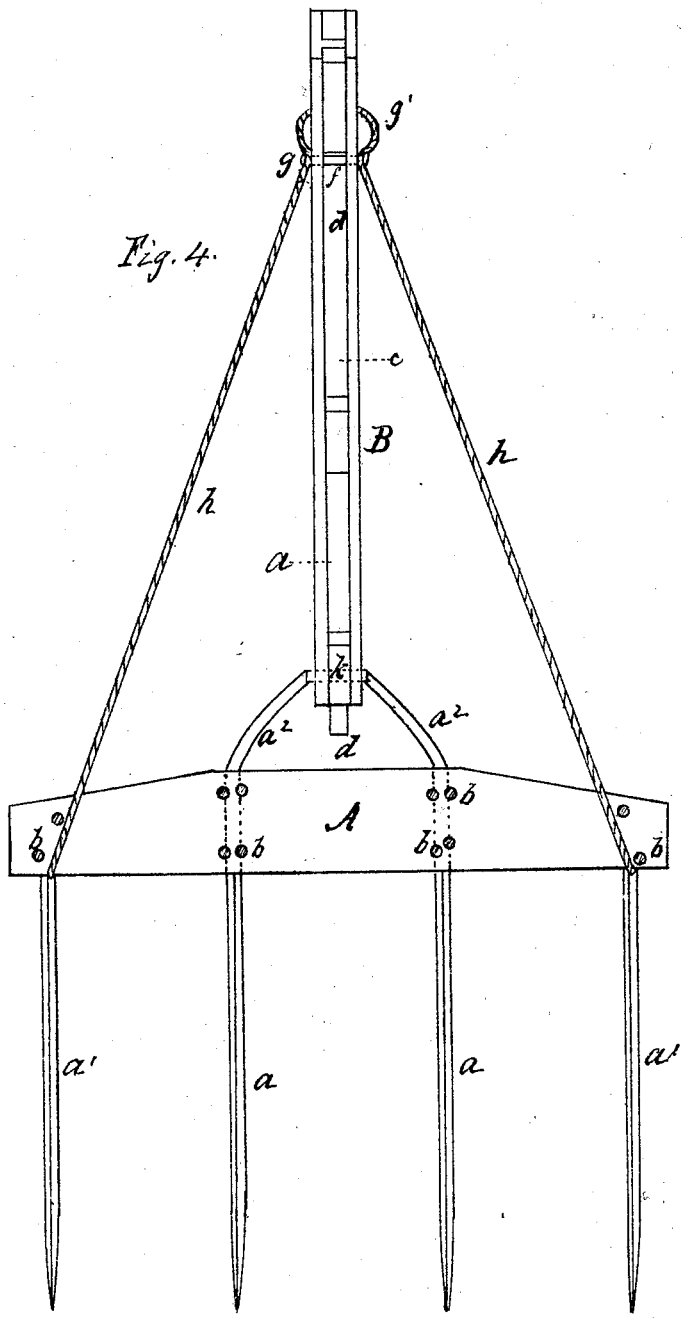

UNITED STATES PATENT OFFICE.

EUGENE B. TANNER, OF ATTICA, OHIO.

IMPROVEMENT IN HORSE HAY-FORKS.

Specification forming part of Letters Patent No. 44,470, dated September 27, 1864.

*To all whom it may concern:*

Be it known that I, EUGENE B. TANNER, of Attica, Seneca county, State of Ohio, have invented a new and Improved Hay-Fork; and I do hereby declare that the following is a full, clear, and exact description thereof, reference being had to the accompanying drawings, making a part of this specification, in which—

Figure 1 is a side elevation of my fork suspended in a position for receiving and elevating hay. Fig. 2 is a side view, showing the tines of the fork in a position for discharging its load. Fig. 3 is a view of the handle of the fork, with one side of this handle removed to show the latch-lever. Fig. 4 is a front view of the fork and handle. Figs. 5 and 6 represent the manner of securing the tines of the fork to their head.

Similar letters of reference indicate corresponding parts in the several figures.

My invention relates to improvements in the construction of forks for elevating hay into barns or upon stacks, &c.; and the object of my invention is to so apply a lever to the handle of the fork that this lever will serve as a latch for holding the tines of the fork in a position for elevating hay, and as a means whereby the load can be discharged from the fork at pleasure, and also as an auxiliary in the attachment of the fork-head to the handle thereof, as will be hereinafter described.

To enable others skilled in the art to make and use my invention, I will describe its construction and operation.

The tines $a$ $a$ $a'$ $a'$ of the fork are secured into a wooden head, A, in the following manner: The two intermediate tines, $a$ $a$, are formed of one piece of metal rod, bent into the shape represented in Fig. 4, and inserted through the head A, so as to leave the looped portion $a^2$ projecting from the back of said head. These tines, together with the single tines $a'$ $a'$, are securely fastened into their head by cutting notches on each side of their butt-ends, and then, after the tines are properly adjusted in place, (into their head,) pins $b$ $b$ are driven through the head, so as to enter said notches, as shown in Figs. 4, 5, 6. This mode of securing the tines in place is very simple and efficient, and almost any ordinary workman can either construct such a fork or repair it when worn out. The transverse pins which are used to lock the tines in place in their head serve also as a means for preventing their head from splitting in consequence of the strain put upon the tines. That portion, $a^2$, of the tines $a$ $a$ which projects out from the back of the head A and forms a loop is intended as one means for connecting the fork to its handle B, which I will now describe.

The handle of the fork has an open slot, $c$, through it, extending from one end to the other, which slot receives a long lever, $d$, that is pivoted at $e$ to the uppermost end of the handle, while its lower end is left free to swing. This lever $d$ has a shoulder formed on it at $f$, which is intended for receiving a transverse pin, $g$, that slides up and down in slots in the sides of the handle, as shown at $i$ $i$, Figs. 1, 2, and 3. The sliding pin $g$ has attached to its ends cords or chains $h$ $h$, which are secured at their lower ends to the fork-head A, as shown in Fig. 4. When the slide $g$ is drawn upward and rested upon the shoulder $f$ of lever $d$, as in Figs. 1 and 3, the fork will be held in the position indicated in Fig. 1; but when the lower end of lever $d$ is drawn out very slightly the pin $g$ will be released from its shoulder and allowed to drop down to the position represented in Fig. 3, the fork of course falling to its depressed position by its own gravity as soon as the pin $g$ is released. At the lowermost end of the handle B a hooked support, $k$, is rigidly secured between the two side pieces of this handle, the object of which is to serve as a support and lower bearing for the looped portion $a^2$ of the tines $a$ $a$, and also as a means for connecting the looped portion $a^2$ to the handle. This looped portion $a^2$ enters notches in the handle, and thus the forked end of the handle, together with the hooked portion $k$, forms a very strong and substantial hinged connection between the handle and fork.

To the lower end of the lever $d$ a rope, $n$, is attached, which serves as a means by which a person standing on the ground can trip the slide $g$ and tilt or upset the fork when this fork is in an elevated position over the stack of hay.

To the slide $g$ a loop, $g'$, is attached, as shown in Figs. 1 and 3, by means of which the implement can be suspended; or, if desirable, the suspension-rope can be attached to the implement, as represented in Figs. 1 and 2. In the former case the handle B will rise as the tines discharge their load. In the latter case the handle will remain stationary while the tines discharge their load.

One of the advantages attending the use of the long lever-latch $d$ is that, when the rake is loaded with hay, all the strain or weight of the hay will be upon the shoulder $f$ of the lever $d$. Consequently it is necessary to have a long leverage in order to trip the fork when loaded and suspended, as it will be in practice. This long lever which I use is pivoted to the upper end of the handle, and is extended to the lower end thereof and inclosed within or by the two sides of the handle of the fork, so that the whole arrangement is made very compact and portable.

What I claim as new, and desire to secure by Letters Patent, is—

1. The use of a pivoted lever, $d$, having a shoulder formed on it at $f$, in combination with the fork-handle B, constructed with a sliding pin, $g$, and a hinged fork, substantially as described.

2. Connecting the fork to its handle B by means of a loop, $a^2$, hook $k$, and notches formed in the handle, substantially as described.

3. The combination of slotted handle B, pivoted latch-lever $d$, slide $g$, connections $h\ h$ and $k$, and the hinged fork, substantially as described.

Witness my hand in the matter of my application for a patent on an improved hay-elevator fork this 7th day of May, 1864.

EUGENE B. TANNER.

Witnesses:
S. S. CARSON,
L. KINWOOD.